United States Patent [19]

Percival-Smith

[11] Patent Number: 5,466,107

[45] Date of Patent: Nov. 14, 1995

[54] SPACER WASHER FOR BOLTED JOINT

[75] Inventor: Harry D. Percival-Smith, Manchester, England

[73] Assignee: Hydra-Tight Limited, United Kingdom

[21] Appl. No.: 183,749

[22] Filed: Jan. 21, 1994

[30] Foreign Application Priority Data

Feb. 5, 1993 [GB] United Kingdom .................. 9302301

[51] Int. Cl.⁶ ............................................ F16B 43/02
[52] U.S. Cl. .................................... 411/546; 411/916
[58] Field of Search .................................. 411/546, 542, 411/8, 916, 917, 531

[56] References Cited

U.S. PATENT DOCUMENTS

| | | | |
|---|---|---|---|
| 3,707,107 | 12/1972 | Bierl | 411/916 |
| 4,326,826 | 4/1982 | Bunyan | 411/432 |
| 4,648,753 | 3/1987 | Stephan | 411/8 |
| 5,316,319 | 5/1994 | Suggs | 411/917 |

FOREIGN PATENT DOCUMENTS

| | | |
|---|---|---|
| 7201561 | 8/1973 | France . |
| 1150062 | 4/1969 | United Kingdom . |
| 1078809 | 8/1978 | United Kingdom . |

*Primary Examiner*—Flemming Saether
*Attorney, Agent, or Firm*—Nixon & Vanderhye

[57] ABSTRACT

A spacer washer 20 (FIG. 2) for disposing between a nut and a turbine casing flange (16, 12 FIG. 5) has a foot end 24 corresponding to the footprint of the nut and extends with wall thickness 25 in one radial direction 28 no further than the nut footprint, to permit minimum spacing pitch, but extends in the orthogonal direction 29 with greater wall thickness 30 to provide support outside the nut footprint for a hydraulic bolt tensioner in a plane displaced from the flange and possibly overhanging part of the casing. The length of the spacer washer may vary from bolt to bolt along the flange to bring nuts from a stepped flange to the same plane and/or increasing the effective bolt length to the nut enables tensile stress to be introduced easier and more accurately.

12 Claims, 2 Drawing Sheets

SPACER WASHER FOR BOLTED JOINT

BACKGROUND

This invention relates to spacer washers for disposing between a surface from which a threaded bolt or stud element extends and a nut threaded onto the element.

In this specification, which concerns the disposition of an internally threaded nut on an externally threaded elongate element, the latter may be a bolt, having a separate head passing through apparatus, e.g. flanges, or a stud held by threaded interengagement with the apparatus, and for simplicity and clarity of description, the term "bolt" is used hereinafter as including a stud in the alternative, unless the context indicates otherwise.

The invention is particularly concerned with spacer washers for use with large diameter nut and bolt combinations employed to exert large closing forces on apparatus, such as turbine casings, in circumstances where each nut and bolt combination is one of a plurality disposed in close proximity and with limited accessibility.

Referring to FIGS. 1(a) and 1(b) which show in plan and elevation views respectively a typical section of turbine apparatus 10 in which casing parts having peripheral flanges 12, 13 clamped to each other by means of closely pitched nut and bolt assemblies, $14_1$, $14_2$ . . . , the clamping force results from the retention of tensile stress in the bolt elements $15_1$, $15_2$ by means of nut $16_1$, $16_2$ abutting the flange 12 by way of so-called spherical washer assemblies $17_1$, $17_2$ which compensate for absence of true perpendicularity of any elements with respect to the flange surface. It is a common feature of such installations that the tensile stress to be retained in the elements must be both large and precisely defined and, furthermore, it is common practice that such tensile stress is induced during installation by stretching the element by way of a temporarily attached, annular hydraulic bolt tensioner rather than by torquing the nut, the bolt tensioner thereafter being removed.

Such annular hydraulic bolt tensioners are well known per se, for example, as described in patent specification GB 1590131. Essentially such a tensioner comprises an annular piston and cylinder arrangement which attaches to, and surrounds, the element and induces tensile stress therein, with consequential stretching of the element, by relative axial displacement of the piston and cylinder. Whilst the tensioner is providing the stress, the nut is run along the element into abutment with the spherical washer with relatively little resistance such that when hydraulic pressure is relieved the tensile stress is maintained by the nut at an accurately predetermined residual level. To react the force exerted by the tensioner on the element into the flange, the tensioner includes a bridge which surrounds or straddles the nut whilst permitting it to be run along the element by way of an access slot in the bridge housing.

It will be seen that not only can the residual tensile stress bend be more accurately defined than when the nut is torqued by overcoming friction, but the tensioner in general may be employed in confined spaces where there is no access for torquing tools.

Situations may arise, as in FIG. 1 wherein it is desirable to have the nut or bolt combinations of such close pitch to each other and/or so close to the casing part that the area of contact between the nut and washer and between washer and flange, which for convenience in this specification is called the footprint of the nut, is all that is available for each nut and bolt pair. However, in order to provide an area of flange for supporting a tensioner bridge straddling the nut during installation or removal, it has been necessary to compromise in terms of having a greater spacing pitch and/or using smaller diameter bolts or nuts than is desirable.

Such situation may be exacerbated, as shown in FIG. 1, by the flange surface being stepped as shown at $10_1$ and partially enclosed by other parts, of the casing or flange.

It is an object of the present invention to provide a spacer washer suitable for such a bolted joint arrangement that facilitates easier and improved bolting, and a bolt joint arrangement including such spacer washer.

According to one aspect of the present invention, a spacer washer is provided for a bolted joint of the type in which a threaded bolt or stud element, extending from apparatus is held in tension by means of a nut carried by the element and bearing against the apparatus by way of a spacer washer, having been put into tension by hydraulic bolt tensioning means reacting against the apparatus by way of a bridge straddling the nut, the spacer washer including an elongate body having (i) a through-aperture coaxial with the longitudinal axis of the body and of uniform diameter to provide a clearance fit for the body over a said element, (ii) at one foot end, a body wall of substantially uniform thickness corresponding to the footprint of a said nut, and (iii) at the other head end, in a first direction perpendicular to, and through, the longitudinal axis, a body wall thickness corresponding to the body wall thickness of the foot end and in a second direction, generally orthogonal to the first direction, a body wall thickness greater than that in said first direction, said body head end providing a support face for the nut coextensive with the footprint of the nut and in at least said second direction, a support region of such hydraulic tensioner bridge radially outwardly of the nut footprint.

According to a second aspect of the present invention a bolted joint is provided which includes a threaded bolt or stud element extending from apparatus, a spacer washer as described above, and disposed with said foot end abutting the apparatus and the element extending through said through-aperture, and a nut, threaded onto the element and in abutment with the head end of the spacer washer, holding the element in tension by reaction with the apparatus by way of the spacer washer.

An embodiment of the present invention will now be described by way of example with reference to the accompanying drawings.

DETAILED DESCRIPTION OF THE DRAWINGS

Figure 1A:
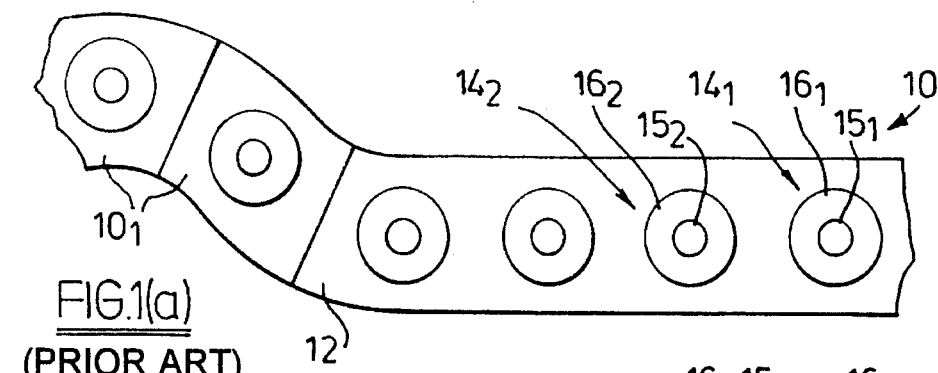
FIGS. 1(a) and 1(b) illustrate in plan and elevation views respectively apparatus as hereinbefore described in the form of turbine casing parts secured together by means of closely pitched, and known, nut, bolt and spherical washer assembles.
Figure 1B:
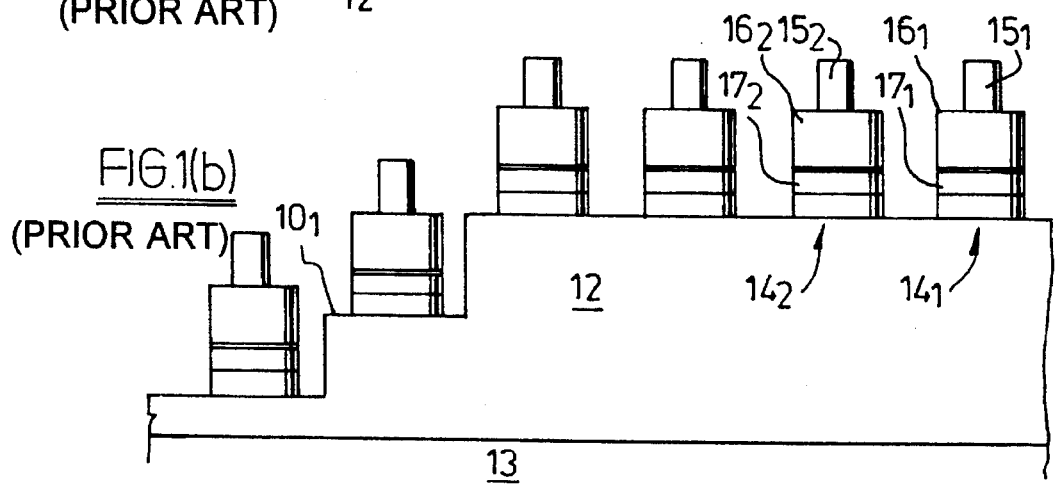
Figure 2:
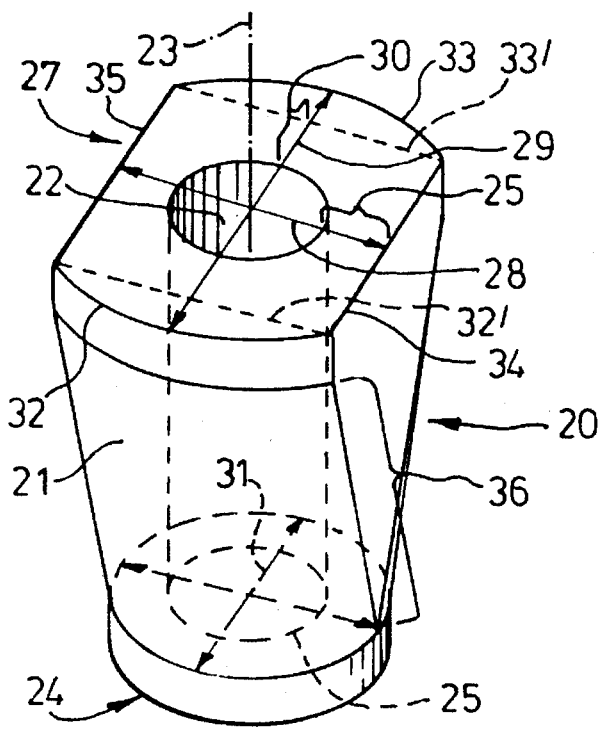
FIG. 2 is a perspective view of a spacer washer in accordance with a first embodiment of the present invention.
Figure 3:
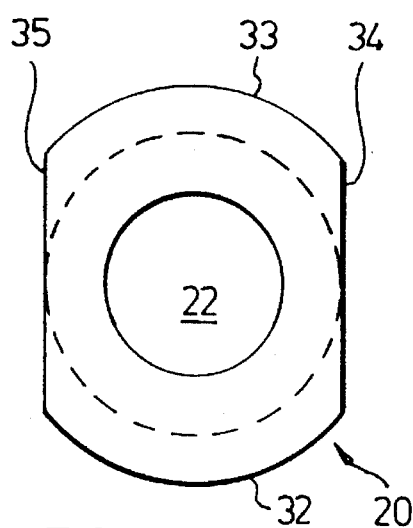
FIG. 3 is a plan view of the spacer washer of FIG. 2.
Figure 4:
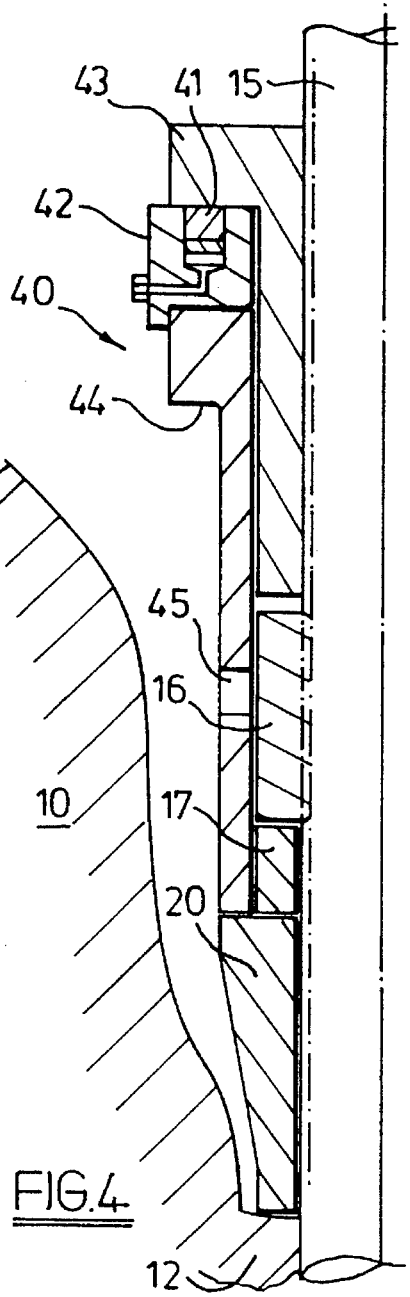
FIG. 4 is a partly sectional elevation of the spacer washer of FIGS. 2 and 3 operationally disposed in relation to a nut, bolt and spherical washer assembly and supporting a hydraulic bolt tensioner.

Referring to FIGS. 2 to 4 a spacer washer 20 in accordance with the present invention is employed in relation to each of the bolted joints shown in FIG. 1 for joining the flanges 13 and 12. Reference to use with the nut, bolt and spherical washer assemblies thereof employs the similar reference numerals but generalised, that is, bolt 15, nut 16 and spherical washer assembly 17. The spacer washer comprises an elongate body 21 having a through-aperture 22 coaxial with the longitudinal axis 23 of the body. The aperture is circular in cross section of uniform diameter to provide a clearance fit for the body over an elongate bolt element 15 with which used. At one end of the body, conveniently called a foot end 24, intended to rest on a substantially planar surface of apparatus from which the bolt element extends, the body has a substantially uniform wall thickness 25 around the longitudinal axis 23 and corresponding to the footprint of the nut 16 with which used.

At the other end of the body, conveniently called the head end 27, the wall thickness is asymmetric about the longitudinal axis. In a first direction, indicated by arrow 28, perpendicular to, and through, the longitudinal axis, the body wall has the aforementioned thickness 25 of the body wall thickness of the foot end. In a second direction, indicated by arrow 29, generally orthogonal to the first direction, the body wall has a thickness 30 greater than that 25 in the first direction.

Whereas the periphery of the foot end 24 is circular, giving it on overall diameter 31, the periphery of the head end is defined by two oppositely disposed circular arcs 32, 33 each centred on the second direction axis 29 and each of chord length ($32^1$, $33^1$) substantially equal to the diameter 31 of the foot end. The arcs 32, 33 are joined to each other by substantially straight parallel edges 34 and 35.

Between the head and foot ends, the body has in the second direction a substantially uniformly tapering decrease in wall thickness. In the embodiment as illustrated, the taper extends for part only, 36, of the length of the body.

Referring particularly to FIG. 4, a flange 12 of a turbine casing 10 has a threaded bolt 15 extending therefrom. The spacer washer 20 is disposed on the bolt such that the bolt passes through and extends from the aperture 22 and the foot end 24 rests on the flange 12. A conventional spherical washer assembly 17 and a nut 16 are threaded onto the bolt and a hydraulic bolt tensioner 40 is disposed to encircle the free end of the bolt and the nut. The bolt tensioner is essentially conventional in comprising a piston 41 and cylinder 42 portion which supports and displaces an internally threaded annular puller 43 which is threaded onto the free end of the bolt. The cylinder portion is supported on a bridge 44 which surrounds and straddles the nut 16, being itself supported on the head end 27 of the spacer washer 24. The peripheral wall of the bridge is clearly disposed radially outwardly of the footprint of the nut. The lengths of the bridge and of the bolt 15 and/or the puller 43 are chosen to locate the relatively large diameter piston and cylinder portions away from the turbine casing and above the level of the adjacent bolt ends and may be radially narrower than the piston and cylinder portions but still has to surround the nut. The bridge may, for a large part of its length, have opposite sides thereof truncated in one diametrical direction corresponding to the first direction 28 associated with the spacer washer and for such a length that extends above the height of the nut, or of more practical importance, the height of a nut on an adjacent bolt. The bridge 44 contains a conventional window 45 for accessing the nut 16.

Figure 5A:
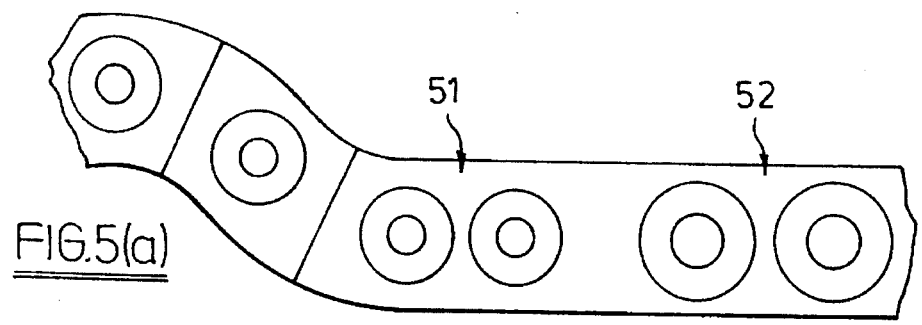
FIGS. 5(a) and 5(b) are respectively plan and elevation view, similar to FIG. 1, of a turbine casing including flanges bolted together by bolted joints including spacer washers of the type of FIGS. 2 and 3 and of different lengths to equalise the nut positions in a stepped flange.

Referring to the plan view of FIG. 5(a) it will be seen that the use of a spacer washer as described above provides a support for the tensioner bridge and the nut that is displaced from the surface of the flange that is advantageous in several respects.

By removing the need to reserve part of the flange surface for supporting the tensioner bridge outside the footprint of the nut, the bolt pitch spacing may be reduced, as illustrated at 51, such that the nuts are almost touching, or larger diameter bolts may be used, as illustrated at 52. It will be seen that in some circumstances the nut footprint may extend up to a convexly rising casing wall as the head end of the spacer overhangs it.

Furthermore, the effective length of the bolt, that is the part between the end secured within the casing and the nut, is increased by use of the spacer, enabling the tensile stress introduced by the tensioner and retained by the nut to be developed more readily, to a greater extent and more accurately than when the nut abuts the casing flange.

Figure 5B:
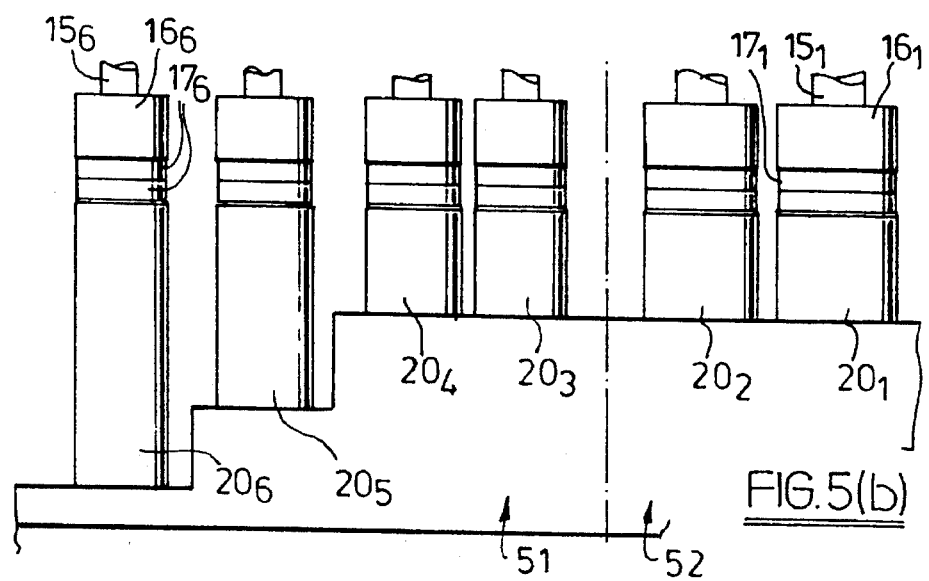

Referring also to FIG. 5(b) the ability to vary the length of each spacer washer $20_1$, $20_2$ enables usage in relation to stepped flanges in such a way that the head ends of the respective spacer washers, and therefore the nut positions, lie in the same plane along the whole flange. Such an arrangement may facilitate the use of plural bolt tensioners formed within a common body.

As described above and shown, the tapered wall extends over part only of the length of the spacer washer body. It will be appreciated that the length of taper in relation to a predetermined body length and/or the degree and/or profile of taper may be chosen to provide clearance in use of any particular casing configuration or protuberances from the casing.

It will be appreciated that the standard spherical washer assembly 17 shown disposed between the nut 16 and the head end of the spacer washer 20 may be disposed between the foot end of the spacer washer and the casing flange, being of the same footprint. Furthermore, the head and/or foot end of the spacer washer may be provided with a spherically contoured end to comprise one part of a spherical washer assembly.

The spacer washer is formed from suitable material having the appropriate properties for transmitting compressive loading through the area of the nut footprint, even when generated over a smaller area radially outwardly of the footprint by the hydraulic tensioner. Whatever concentration of loading is effected on the head end of the spacer washer, it will be seen that the casing flange is only ever subjected to loading diffused over the whole nut footprint area.

It will be understood that the form taken by the periphery of the head end may differ from that described above. For instance, the region of increased wall thickness may have a periphery other than formed by arcs of circles, or by arcs of circles centred on the longitudinal axis.

Indeed the wall thickness of the head end in said first direction may exceed that of the foot end, particularly in a situation such as when the head end does not interfere with an adjacent nut and bolt assembly because of an existing pitch spacing and a greater support area is made available to the tensioner bridge.

I claim:

1. A spacer washer for a bolted joint of the type in which a threaded bolt or stud element, extending from an apparatus, is held in tension by means of a nut carried by the element and bearing against the apparatus by way of a spacer washer, having been put into tension by hydraulic bolt tensioning means reacting against the apparatus by way of a bridge straddling the nut, the spacer washer comprising an elongate body having a longitudinal axis and:

(i) a through-aperture coaxial with the longitudinal axis of the body and of uniform diameter to provide a clearance fit for the body over a said element, (ii) at one foot end, a body wall of substantially uniform thickness corresponding to a footprint of a said nut, and (iii) at the other head end, in a first direction perpendicular to, and through, the longitudinal axis, a body wall thickness corresponding to the body wall thickness of the foot end and in a second direction, generally orthogonal to the first direction.

2. A spacer washer as claimed in claim 1 in which the foot end has a circular periphery and a diameter centered on the longitudinal axis, and the periphery of the head end is defined by two oppositely disposed circular arcs, each centered on said second direction and each having a chord length substantially equal to the diameter of the foot end periphery, said circular arcs joined to each other by substantially straight parallel edges.

3. A spacer washer as claimed in claim 1 in which in said second direction, the wall thickness of the foot end and of said head end are joined by a substantially uniform taper.

4. A spacer washer as claimed in claim 3 in which the taper extends for part only of the length of the body.

5. A spacer washer as claimed in claim 1 in combination with the bolted joint including the threaded bolt or stud element extending from the apparatus, wherein the spacer washer is disposed with said foot end abutting the apparatus and the element extending through said through-aperture and the nut, and threaded onto the element and in abutment with the head end of the spacer washer, thereby holding the element in tension by reaction with the apparatus by way of the spacer washer.

6. A spacer washer as claimed in claim 1 wherein said body head end provides a support face for the nut coextensive with the footprint of the nut and in at least said second direction but not in said first direction, a support region for the bridge extending radially outwardly of the nut footprint.

7. A spacer washer for a bolted joint of the type in which a threaded bolt or stud element, extending from an apparatus, is held in tension by means of a nut carried by the element and bearing against the apparatus by way of a spacer washer, having been put into tension by hydraulic bolt tensioning means reacting against the apparatus by way of a bridge straddling the nut, said nut having a radially extending face defining a footprint by which the nut bears against the spacer washer, said spacer washer comprising an elongate body having a longitudinal axis therethrough, a through aperture of uniform diameter and coaxial with the longitudinal axis, to provide a clear fit for the body over said element, a foot end arranged to bear against the apparatus, and a head end against which a cooperating nut bears, spaced from the foot end along the longitudinal axis, the body wall at said foot end being of substantially uniform thickness and the body wall at said head end having a thickness not less than the thickness at the foot end in a first direction and a greater thickness in a second direction than in said first direction.

8. A spacer washer as claimed in claim 7 in which the body wall, at said foot end, has a substantially uniform thickness corresponding to a footprint of a cooperating nut and, at said head end, has a minimum thickness in said first direction the same as the foot end.

9. A spacer washer as claimed in claim 7 for supporting the nut spaced from a flange of the apparatus, the apparatus having a shaped casing extending above the flange, the wall thickness of the spacer washer body between said foot and head ends is flared from the foot end towards the head end in said second direction in conformity with the shape of the casing with respect to the flange.

10. A spacer washer as claimed in claim 9 in which the periphery of the foot end is circular.

11. A spacer washer as claimed in claim 10 in which the wall thickness is flared for part only of the length of the body.

12. Bolt tensioning means including a bridge, for reacting tension in a bolt to be fastened against a flange from which the bolt extends, and a spacer washer as claimed in claim 7 in which the head end of the body of the spacer washer in at least said second direction has a wall thickness greater than in the first direction to provide reaction receiving parts for the bridge.

* * * * *